US012769664B2

(12) United States Patent
Budhkar et al.

(10) Patent No.: US 12,769,664 B2
(45) Date of Patent: Oct. 20, 2026

(54) ACCELERATOR FOR CONCURRENT INSERT AND LOOKUP OPERATIONS IN CUCKOO HASHING

(71) Applicant: Intel Corporation, Santa Clara, CA (US)

(72) Inventors: Prerna Budhkar, Hillsboro, OR (US); Tanvi Sharma, West Lafayette, IN (US); Srivatsa Rangachar Srinivasa, Hillsboro, OR (US); Dileep John Kurian, Portland, OR (US); Tanay Karnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/080,980

(22) Filed: Dec. 14, 2022

(65) Prior Publication Data

US 2023/0112575 A1 Apr. 13, 2023

(51) Int. Cl.
*G06F 12/0864* (2016.01)
*G06F 12/14* (2006.01)

(52) U.S. Cl.
CPC ...... *G06F 12/0864* (2013.01); *G06F 12/1466* (2013.01); *G06F 2212/1052* (2013.01); *G06F 2212/604* (2013.01)

(58) Field of Classification Search
CPC ............. G06F 12/0864; G06F 12/1466; G06F 12/0895
See application file for complete search history.

(56) References Cited

U.S. PATENT DOCUMENTS

| | | | | |
|---|---|---|---|---|
| 11,520,769 | B1 * | 12/2022 | Zheng | G06F 16/2365 |
| 2004/0117600 | A1 * | 6/2004 | Bodas | H04L 69/161 712/210 |
| 2019/0102346 | A1 * | 4/2019 | Wang | G06F 16/90335 |
| 2019/0303468 | A1 * | 10/2019 | Park | G06F 16/2255 |

FOREIGN PATENT DOCUMENTS

| | | | | |
|---|---|---|---|---|
| CN | 114116727 A | * | 3/2022 | G06F 9/5016 |

* cited by examiner

*Primary Examiner* — Nicholas A. Paperno
(74) *Attorney, Agent, or Firm* — KDW FIRM PLLC

(57) ABSTRACT

A hash accelerator of a cache memory may receive a query from a processor comprising the cache memory, the query to comprise an input key and an operation to be performed based on a hash table stored in the cache memory. The hash accelerator may determine whether an entry associated with the input key exists in a lock board of the hash accelerator. The hash accelerator may process the query based on whether the entry exists in the lock board.

20 Claims, 8 Drawing Sheets

REPLACEMENT DRAWING

REPLACEMENT DRAWING

ACCELERATOR FOR CONCURRENT INSERT AND LOOKUP OPERATIONS IN CUCKOO HASHING

BACKGROUND

Some memory bound operations may require significant memory resources. Examples of memory bound operations may include hash operations. Hash operations may be part of workloads that may require low-latency and high-throughput. However, hash operations may require additional logic to ensure correctness and concurrency control. Furthermore, hash operations may have low processor core utilization, poor locality, and suffer from stalls due to the long sequence of required instructions to complete the hash operations. Due to irregular memory accesses, hashing operations may exhibit high latency, which may further degrade system performance.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
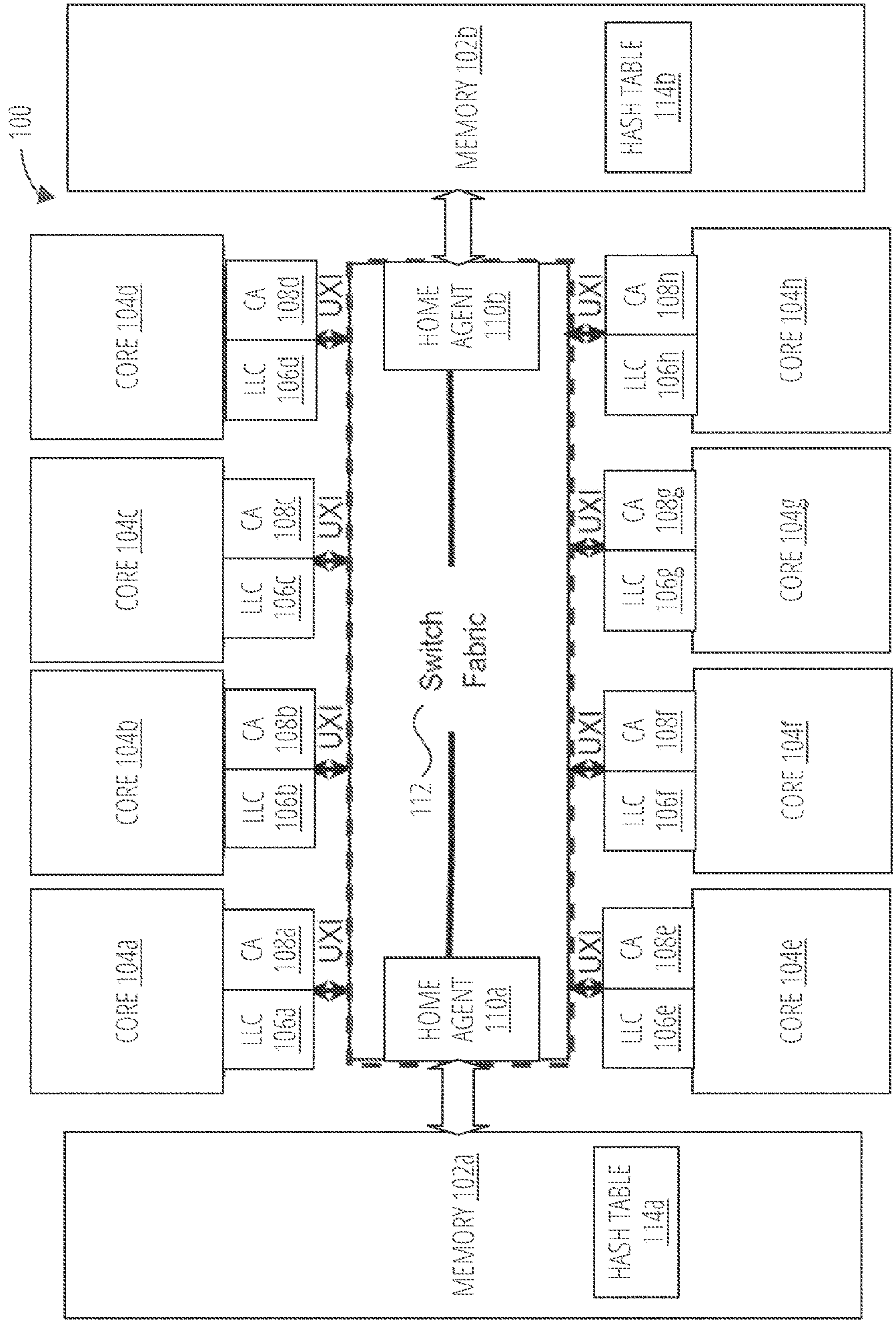
FIG. 1 illustrates an aspect of the subject matter in accordance with one embodiment.

Embodiments disclosed herein provide an accelerator for concurrent hash operations, such as cuckoo hashing operations (which may include insert and/or lookup operations). More specifically, embodiments disclosed herein provide a distributed, near-last level cache (LLC) hash accelerator that reduces data movement which inherently introduces system latency. The LLC hash accelerator may enable faster lookup and insert operations using low-cost optimizations and savings on hash operations that conventionally introduce significant latency. Furthermore, the LLC hash accelerator provides concurrent lookup and insert operations using a distributed design and fine-grained synchronization. Furthermore, the hash accelerator may preemptively service lookup requests during concurrent lookup and insert requests using a low-cost lock board maintained during rearranging entries of insert operations. The hash accelerator may also utilize adaptive fetching of primary and secondary buckets (e.g., in a cuckoo hash table) for proactive execution of hash operations.

The near LLC hash accelerator may perform concurrent hash operations faster than conventional solutions. The near LLC hash accelerator may maintain fine-grained synchronization through an inherent coherence scheme and consistency model. Furthermore, the near LLC hash accelerator may preemptively service lookup requests during concurrent operations, the lookup requests may be processed faster than conventional solutions, which may require additional concurrency/synchronization checks and generally may require additional system resources and introduce additional latency. Furthermore, by implementing adaptive fetching of buckets may mask the long memory latency of hash operations.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 121 illustrated as components 121-1 through **121-*a* may include components 121-1, 121-2, 121-3, 121-4, and 121-5**. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 1 illustrates an example system 100. The system 100 may generally accelerate concurrent cuckoo hashing operations, such as insert and lookup operations. As shown, the system 100 includes one or more processor cores **104*a*-104*h*, main memory 102*a*, and main memory 102*b* communicably coupled via a switch fabric 112. Each core 104*a*-104*h* includes at least one last level cache (LLC) 106*a*-106*h*. One example of an LLC cache is an L3 cache. The LLCs 106*a*-106*h* may be slices of the same cache memory or separate cache memories. Each LLC 106*a*-106*h* may include a respective caching agent 108*a*-108*h*. The cores 104*a*-104*h*, LLCs 106*a*-106*h*, and caching agents 108*a*-108*h* may be coupled to the switch fabric 112 via one or more interfaces, such as UXI interfaces. In some embodiments, each of the cores 104*a*-104*h* may include any number of cores. For example, each core 104*a*-104*h* may itself include 4 cores, 8 cores, 16 cores, 32 cores, etc. However, each core 104*a*-104*h* may share an LLC instance (e.g., LLC 106*a*-106*h*) while having disaggregated caching agents 108*a*-108*h* and home agents 110*a*, 110*b***.

Often, the cores 104*a*-104*h* may execute software that require hash computations, such as lookup operations and/or insert operations in one or more hash tables, such as hash tables 114*a*, 114*b*. Although depicted in main memory 102*a*, 102*b*, in some embodiments, the hash tables 114*a*, 114*b* may be stored in the LLCs 106*a*-106*h* (not pictured therein for the sake of clarity). In some embodiments, accesses to the hash tables 114*a*, 114*b* are "cuckoo hashes", which includes a scheme for resolving hash collisions of values of hash functions in the hash tables 114*a*, 114*b*. Cuckoo hashing may be used in many different contexts, including storage systems (e.g., top-k query processing optimization of big data queries via automated program reasoning), packet processing (e.g., network function virtualization (NFV) to provide Quality of Service (QoS), virtual private network (VPN), policy-based routing, traffic shaping, firewalls, and network security). Therefore, the components of the system 100 may be included in any type of processing device, such as a server, a memory controller, a storage controller, a network interface controller (NIC), a network appliance (e.g., a router, switch, etc.), an Infrastructure Processing Unit (IPU), a data processing unit (DPU), and the like. One example of software that uses cuckoo hashing is the Data Plane Development Kit (DPDK). Another example of software that uses cuckoo hashing is the Open Data Plane (ODP).

Figure 2A:
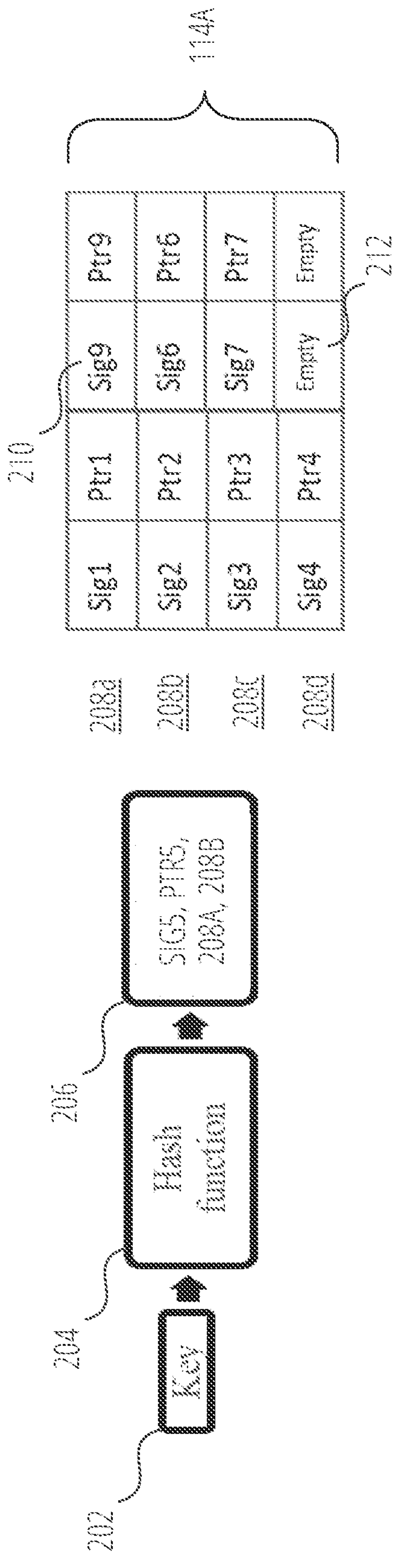
FIG. 2A illustrates an aspect of the subject matter in accordance with one embodiment.

FIG. 2A is a schematic illustrating an example of cuckoo hashing. More specifically, FIG. 2A illustrates an example of an insert operation in hash table 114*a* using a cuckoo hashing algorithm (or function). Embodiments are not limited in this context.

As shown, the hash table 114*a* includes a plurality of buckets 208*a*-208*d*. Each bucket may include one or more entries and is associated with a unique bucket address, also referred to as a hash index and/or index value (not pictured) that uniquely identifies each bucket 208*a*-208*d*. Each entry may include a signature of an input key and a pointer to a key-value pair location. For example, as shown, entry 210 includes a signature value "sig9" and an associated pointer "ptr9."

Generally, when an insert operation is generated by one of the cores 104*a*-104*h* at block 202, the insert operation may specify an input key (which may include an associated value) to be inserted in the hash table. The insert operation may be specified by an instruction defined by an instruction set architecture (ISA). The ISA may further specify instructions for lookup operations in hash tables. Each ISA instruction may permit for concurrent operations (e.g., two concurrent insert operations, two concurrent lookup operations, and/or at least one insert operation concurrent with at least one lookup operation) in hash tables. More generally, the ISA may specify processor instructions to facilitate, coordinate, and offload hash table operations. One example of an ISA is the Intel® ISA. At block 204, a hash function is applied to the input key to compute a signature and the bucket address corresponding based on the input key. Examples of hash functions include, but are not limited to, the jhash function or the murmur function.

Cuckoo hashing may resolve collisions by using two hash functions instead of only one, thereby providing two possible locations in the hash table for each key. Generally, collisions or coherency issues may occur as different software entities access the hash table 114*a*. In some embodiments, the hash table 114*a* is split into two smaller tables of equal size, and each hash function provides an index (or bucket address) into one of these two tables. In some embodiments, however, both hash functions to provide indexes into a single table. In some embodiments, a single hash function produces a signature and both bucket addresses, where one of the bucket addresses is a primary bucket address and the other one of the bucket addresses is a secondary bucket address.

The output of the hash computation is represented at block 206, which includes an example signature value and associated pointer, a primary bucket of the hash table 114*a* (and/or an address thereof), and a secondary bucket of the hash table 114*a* (and/or an address thereof). For example, as shown, the hash function applied to the input key may result in a signature value of "sig5" with an associated pointer value of "ptr5", a primary bucket 208*a*, and a secondary bucket 208*b*. Therefore, cuckoo hashing operation may specify bucket 208*a* as the primary bucket address and bucket 208*b* as the secondary bucket address. However, as shown, the primary bucket 208*a* already stores data. Because the primary location is occupied, the current entry may be moved to a different bucket by identifying the corresponding signature and bucket address. This is an iterative process that is performed for every insert operation and terminates only when an empty slot is found in one of the buckets 208*a*-208*d*, such as entry 212 of bucket 208*d*. This re-arrangement of keys is one of the differences between cuckoo hash operations and other algorithms. However, doing so requires additional system resources and introduces additional latency.

Figure 2B:
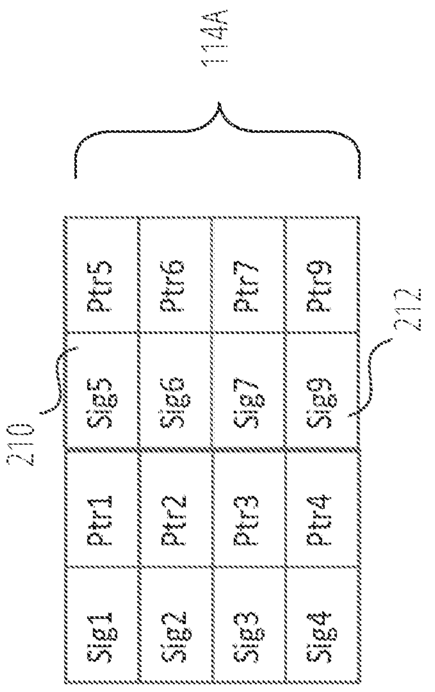
FIG. 2B illustrates an aspect of the subject matter in accordance with one embodiment.

FIG. 2B illustrates the hash table 114*a* after the insert operation of FIG. 2A is completed. As shown, the data previously stored in entry 210 has been moved to entry 212 (e.g., "sig9" and "ptr9"), which freed entry 210. As shown, entry 210 includes "sig5" and "ptr5", which indicates the hashing of the input key (and any associated key value) received at block 202 was stored in entry 210.

Therefore, a cuckoo hashing algorithm has a non-constant insertion time and performs poorly for insert-heavy applications. For example, large networking applications (such as Evolved Packet Core (EPC)) may have many short-lived flows that require repopulating the hash table 114*a* in a short time. Furthermore, because these inserts require additional time, any lookup operations may stall, as the buckets 208*a*-208*d* are locked during insert operations. For example, hash insert operations generally include the requesting entity (e.g., software) acquiring a lock while updating the hash table with a new value to avoid conflicts with other inserts or lookups. Because the buckets 208*a*-208*d* are locked, concurrent inserts and lookups may not be supported by conventional cuckoo hashing algorithms. However, embodiments disclosed herein may allow concurrent insert operations and/or lookup operations to be performed while maintaining coherency and consistency.

Figure 3:
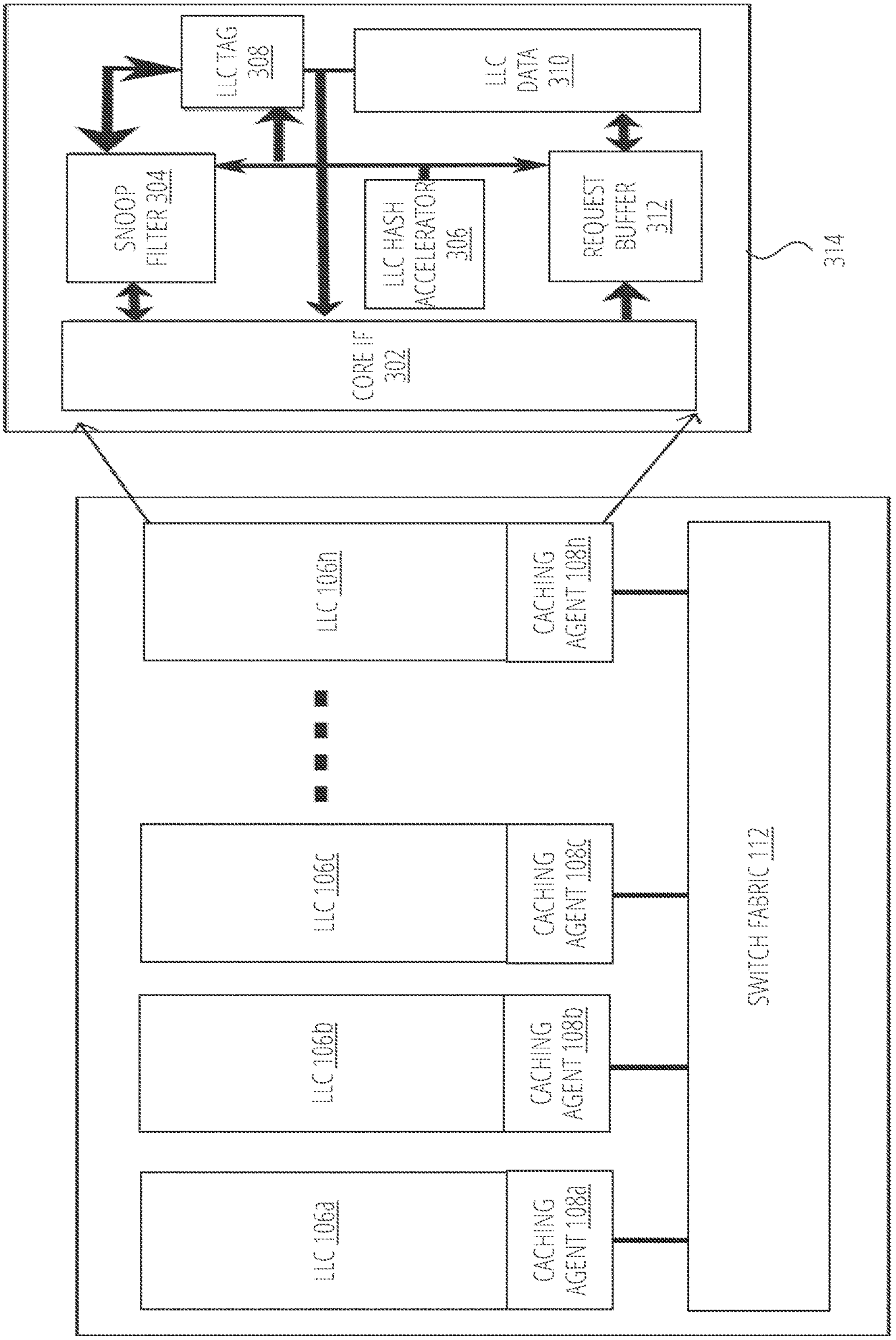
FIG. 3 illustrates an aspect of the subject matter in accordance with one embodiment.

FIG. 3 is a schematic illustrating components of the system 100 in greater detail. As stated, each processor core 104*a*-104*h* may include a respective LLC 106*a*-106*h* and caching agent 108*a*-108*h*. As shown, the components of the LLC 106*h* (which is representative of LLCs 106*a*-106*g*) and the caching agent 108*h* (which is representative of caching agents 108*a*-108*g*) include a core interface 302, a snoop filter 304, an LLC hash accelerator 306, an LLC tag structure 308, and an LLC data structure 310, each of which may be implemented in circuitry 314. The circuitry 314 may be implemented in a memory controller. The memory controller may be used for far memory and/or memory pooling.

The core interface 302 communicably couples the components of FIG. 3 to the respective processor core, e.g., core 104*a*-104*h*. The snoop filter 304 maintains coherency between the LLCs 106*a*-106*h* by monitoring transactions targeting the LLCs 106*a*-106*h*. The snoop filter 304 may maintain coherence according to a coherence protocol. Examples of coherence protocols include, but are not limited to, write-invalidate and write-update protocols. The LLC tag structure 308 stores LLC memory tags that correspond to data stored in the LLC data structure 310. The LLC data structure 310 may store the hash table 114*a* and/or the hash table 114*b* (and/or portions thereof). The request buffer 312 stores requests for hashing operations received from the cores 104*a*-104*h* via the core interface 302. For example, a request may specify to lookup an input key in the hash table 114*a*. As another example, another request may specify to insert another input key (and optionally an associated key value) into the hash table 114*a*. The requests may comprise instructions defined by an ISA. Generally, when a processor identifies such ISA-defined instructions, the processor may offload the ISA-defined instructions to the LLC hash accelerator 306. The decision to offload the ISA-defined instructions may be selectively enabled and/or disabled. For example, an operating system, software, or any other system component may be used to enable and/or disable the offloading of the ISA-defined instructions to the LLC hash accelerator 306.

The LLC hash accelerator 306 may be circuitry for a distributed, near LLC hash accelerator that performs faster and concurrent hashing operations (e.g., inserts, lookups, etc.) in hash tables such as the hash tables 114*a*, 114*b*. The LLC hash accelerator 306 performs concurrent inserts and lookups via fine-grained synchronization through an inherent coherence scheme and a consistency model. The LLC hash accelerator 306 may preemptively service lookup requests during concurrent insert and lookup requests using a low-cost structure (the scoreboard 404 of FIG. 4) maintained during rearrangement of entries incurred via cuckoo hash insert operations. The LLC hash accelerator 306 may further utilize adaptive fetching of primary and secondary buckets (e.g., buckets 208*a*-208*d*) for proactive execution of cuckoo hashing operations, which may obviate the need for software prefetching. By placing the LLC hash accelerator 306 in a respective LLC slice (e.g., a respective LLC hash accelerator 306 in each LLC 106*a*-106*h*), the associated request buffer 312 may offload instructions (e.g., cuckoo hash insert operations, cuckoo hash lookup operations, etc.) to the respective LLC hash accelerator 306, which maintains coherence across the LLCs 106*a*-106*h* while accessing local and/or remote data via the snoop filter 304. As stated, the LLC hash accelerator 306 may be implemented in circuitry, including circuitry for a memory controller. The memory controller may be used for far memory and/or memory pooling.

Figure 4:
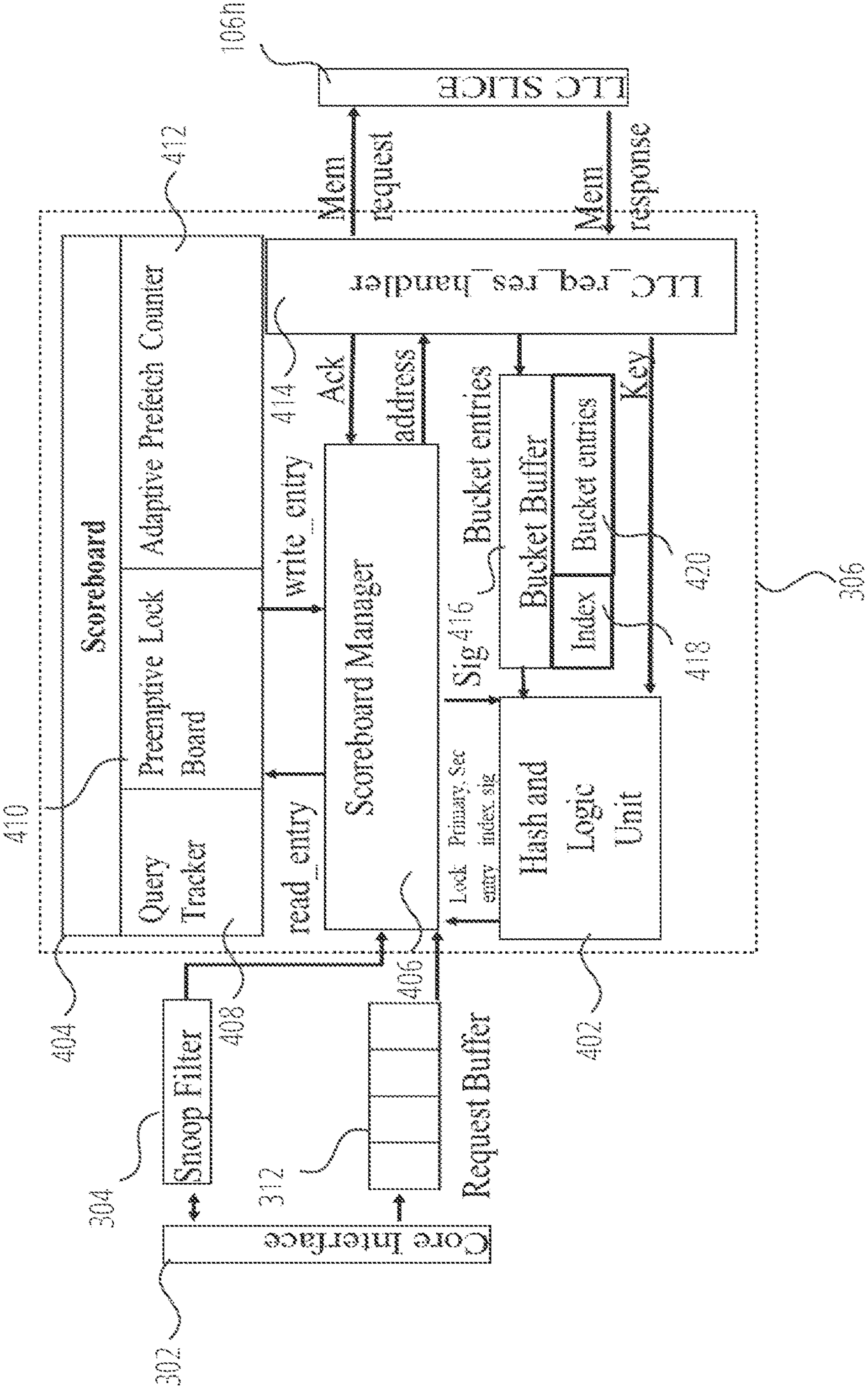
FIG. 4 illustrates an aspect of the subject matter in accordance with one embodiment.

FIG. 4 is a schematic illustrating some or all of the components of the LLC hash accelerator 306 in greater detail. As shown, the LLC hash accelerator 306 includes a hash and logic unit 402, a scoreboard 404, a scoreboard manager 406, an LLC handler 414, and a bucket buffer 416, each of which may be implemented in circuitry (e.g., the circuitry 314). As stated, the circuitry may be implemented in a memory controller. The scoreboard 404 includes a query tracker 408, a preemptive lock board 410, and an adaptive prefetch counter 412. The scoreboard manager 406 generally manages the processing of insert and/or lookup operations targeting a hash table. The query tracker 408 of scoreboard 404 stores key addresses, data (e.g., a value associated with an input key), table addresses, and queries being processed (e.g., cuckoo hashing insert operations using an input key associated with the key address and/or cuckoo hashing lookup operations using the input key). The query tracker 408 may further control how cuckoo hashing insert and lookup operations are performed concurrently.

The preemptive lock board 410 enables fine-grained locking between cuckoo hashing instructions that access the same entry of a hash table 114*a*, 114*b*. More generally, the preemptive lock board 410 may store information used for preemptive completion of instructions when processing concurrent cuckoo hashing instructions. For each instruction, the preemptive lock board 410 may store the primary bucket index (e.g., in buckets 208*a*-208*d*), a secondary bucket index (e.g., in buckets 208*a*-208*d*), alternate buckets (e.g., in buckets 208*a*-208*d*), and a local copy of the matched bucket entry (e.g., a signature value and corresponding pointer from a bucket entry). The preemptive lock board 410 may categorize the matched bucket entries into entries of at least two different types. A first type of entry may be where a bucket is matched based on a key that is already present (e.g., the value is going to be updated in the entry of the hash table 114*a*, 114*b*). For example, the first type of entry may occur where a key-value pair is added to the hash table 114*a* and a subsequent lookup instruction is received that specifies the same key. Conventionally, such instructions may result in a read-write conflict. However, the LLC hash accelerator 306 maintains local information in the preemptive lock board 410 that tracks which instructions have been issued, thereby allowing the LLC hash accelerator 306 to serialize these instructions and thereby implement fine-grained locking (e.g., such that the insert is completed prior to executing the lookup). A second type of entry may be where a bucket is matched because of rearrangement that occurs via cuckoo hashing inserts, where only the location of the entry is changing (but the values remain the same). Again, by maintaining this type of instruction in the preemptive lock board 410, the LLC hash accelerator 306 may identify potential conflicting instructions and serialize the instructions to maintain fine-grained locking.

For example, if a signature for a lookup query may match the signature of one or more entries of the preemptive lock board 410. If the matching entry is of the first type (e.g., where the match is based on the key that is already present and the value is to be updated), the lookup returns the value that is to be updated in the matched entry. If the matching entry is of the second type (e.g., match during rearrangement of inserts), the LLC hash accelerator 306 may service the lookup request without performing the search and compare and does not wait for the rearrangements to complete.

The adaptive prefetch counter 412 stores the primary and secondary buckets computed by the hash and logic unit 402 for instructions received by the LLC hash accelerator 306. The adaptive prefetch counter 412 generally maintains a counter reflecting a number of accesses to a secondary bucket associated with a primary bucket. After the count of accesses to a secondary bucket exceeds a threshold, the LLC hash accelerator 306 begins prefetching the data stored in the primary bucket and the data in the secondary bucket. However, if the counter does not exceed the threshold, the LLC hash accelerator 306 prefetches the data stored in the primary bucket. The threshold may be any programmable threshold.

The hash and logic unit 402 includes circuitry required to compute hash values (according to any hash function), perform search operations (e.g., lookups in the hash tables 114*a*, 114*b*), and perform data comparison operations. Therefore, the hash and logic unit 402 may include logical units for exclusive OR (XOR) operations, AND operations, SHIFT operations, rotate (ROT) operations, and one or more multiplexors.

The bucket buffer 416 generally stores copies of the most recently used bucket entries of a hash table 114*a*, 114*b*. As shown, the bucket buffer 416 may include a unique index 418 for each bucket entry 420. The bucket entry 420 may include key-value pairs of a primary bucket and an associated secondary bucket. For example, a memory response received from the LLC handler 414 may specify the contents of one or more buckets, which may be stored in the bucket buffer 416. Because the same buckets may be iterated over once or twice during insert and/or lookup operations (e.g., first during a "search and compare" operation to find an already present key, then second during an operation to identify an empty entry in the hash table 114*a* to insert the key), the bucket buffer 416 reduces the data request traffic to the LLCs 106*a*-106*h* by providing the locally stored copy to the hash and logic unit 402. Doing so is a lower cost solution compared to conventional solutions that allocate one bit per cache line for locking purposes, as the hash and logic unit 402 need not wait for the hash table 114*a* data to be fetched from the LLC 106*h* and recompute any associated values. The LLC handler 414 is a scheduler that arranges memory requests targeting the LLC 106*h* and responses received from the LLC 106*h*.

Generally, the LLC hash accelerator 306 may receive a query from the associated processor core 104*a*-104*h*. The query may be an insert query which specifies to insert an input key (which may optionally include an associated key value) into a hash table 114*a*, 114*b* or a lookup query which specifies to determine whether an input key (and/or an associated key value) is present in the hash table 114*a*, 114*b*. As stated, these queries may have associated ISA-defined instructions. The result of each query may be returned to the core 104*a*-104*h* or written to a memory address specified by the core 104*a*-104*h* for the query. The execution of insert queries and lookup queries are described in greater detail with reference to FIG. 5 and FIG. 6, respectively.

Generally, for an insert instruction based on a memory address of a key, the key may be fetched from the LLC 106*a*-106*h* and the corresponding signature, primary index and secondary index are stored in the scoreboard 404. A bucket fetch request may be stored in the bucket buffer 416 to search and compare the signature of the key to the signatures in the preemptive lock board 410 using the hash and logic unit 402. If an entry in the query tracker 408 matches the signature of the insert instruction, the LLC hash accelerator 306 may update the preemptive lock board 410 based on the matching entries. If there is no match in the primary bucket, the secondary bucket may be fetched into the bucket buffer 416 for search and compare operations, where the preemptive lock board 410 is updated based on a match. If there is no match in the primary or secondary buckets, the copy of the bucket from the bucket buffer 416 may be used to find an empty slot in the primary bucket. If there is no empty slots in the primary buckets, one entry from the primary bucket may be selected for replacement using the hash and logic unit 402 and the selected entry is updated in the preemptive lock board 410. The insert and/or update request for the selected entry may be initiated in the LLC 106*a*-106*h*. If no empty entry is found, remaining entries from alternate buckets may be selected and initiated until an empty slot is found. Using the pointer from the bucket fetch request, a key compare and data store request may be sent to the pointer location. Based on an acknowledgment of the data store from the LLC 106*a*-106*h*, all entries corresponding to the insert key in flight are cleared and a result signal is sent to the requesting core.

Generally, for lookup instructions, which only require search and compare operations, the request is offloaded to the LLC hash accelerator 306. The request may be based on a memory address of a key. The key may be fetched from the LLC 106*a*-106*h* and the corresponding signature, primary index and secondary index are stored in the scoreboard 404. The signature of the key is compared to entries in the preemptive lock board 410. A bucket fetch request may be stored in the bucket buffer 416. The fetched bucket may be the primary bucket and may be stored in the bucket buffer 416 and compared to the signatures in the preemptive lock board 410. If a match is not found based on the primary bucket, the secondary bucket is fetched to the bucket buffer 416 for comparison to the signatures in the preemptive lock board 410. If a match is found (e.g., of the primary and/or secondary buckets), the pointer of the matching bucket is used for a key compare and data read request.

Figure 5:
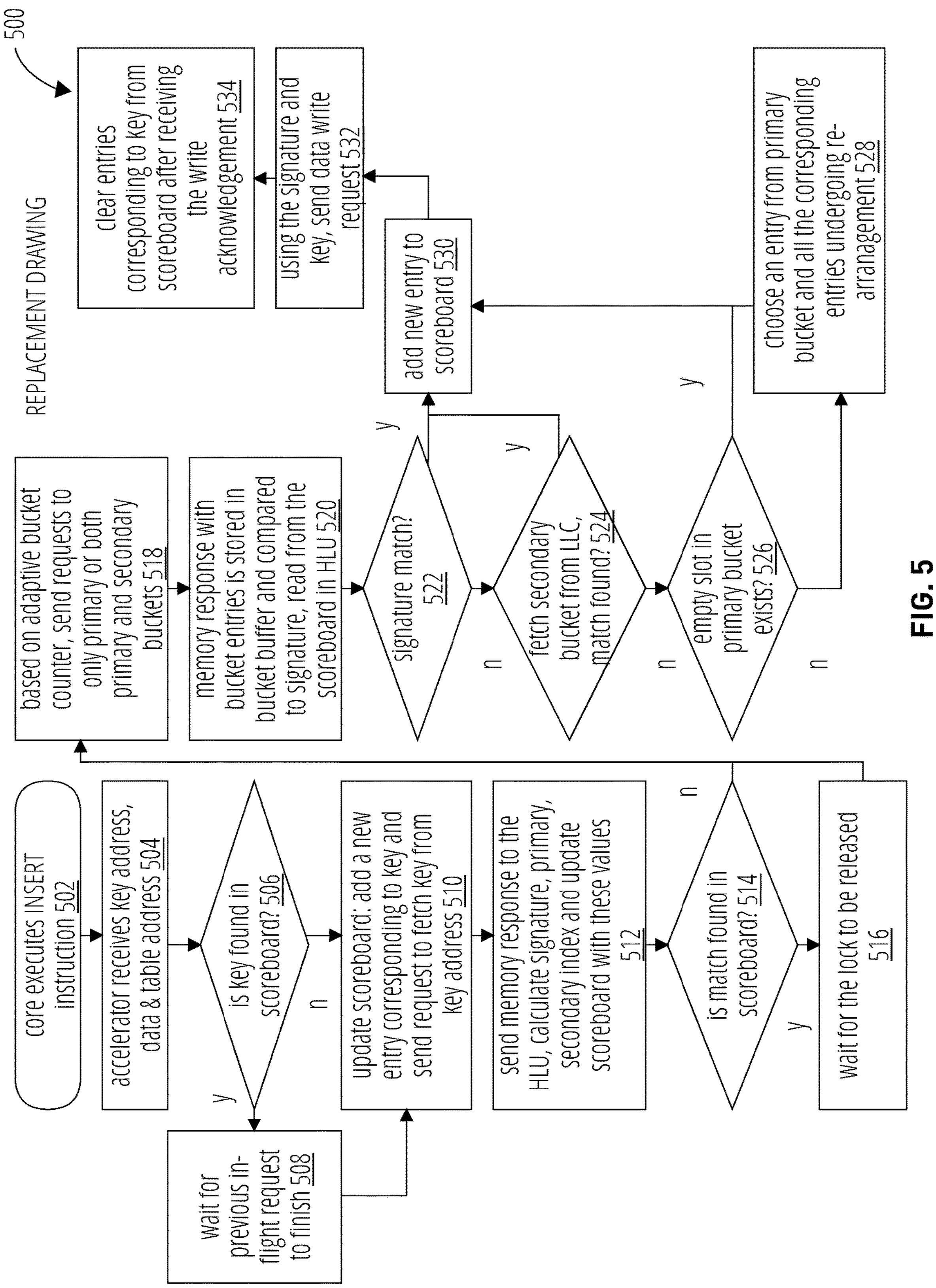
FIG. 5 illustrates an aspect of the subject matter in accordance with one embodiment.

FIG. 5 illustrates a logic flow, or routine, 500. Logic flow 500 may be representative of some or all of the operations to process an insert instruction using the LLC hash accelerator 306. Embodiments are not limited in this context.

As shown, at block 502, a processor (e.g., one of cores 104*a*-104*h*) may execute an insert instruction specifying to insert an input key into a hash table such as hash table 114*a* using a cuckoo hashing algorithm. Because the instruction may be an ISA-defined instruction that is associated with the LLC hash accelerator 306, the processor may offload the instruction to the LLC hash accelerator 306 for processing. At block 504, the LLC hash accelerator 306 may receive the insert instruction, which may specify a key address of the input key, a base address of the hash table 114*a*, and a result destination. The insert instruction may further specify a memory address of the data value associated with the input key, a number of key-value pairs, a number of buckets, and memory addresses of primary and/or secondary buckets.

At block 506, the scoreboard manager 406 determines whether an entry associated with the input key is in the query tracker 408 of scoreboard 404. If the entry associated with the input key is found in the query tracker 408, another query targeting the input key is being processed. Therefore, the logic flow 500 proceeds to block 508, where the logic flow 500 waits for the another query targeting the input key is processed (e.g., to maintain coherency and fine-grained locking between these instructions). Once the processing of the another query is completed, the logic flow 500 proceeds to block 510.

Returning to decision block 506, if an entry for the input key is not found in the query tracker 408, the logic flow 500 proceeds to block 510. At block 510, the scoreboard manager 406 may add an entry for the query to the query tracker 408 (e.g., an entry including the memory address of the input key, the memory address of the associated value of the key-value pair, the base address of the hash table 114*a*). The scoreboard manager 406 may then send a request to the LLC handler 414 to return the input key from the memory address for the input key specified by the query. At block 512, the LLC handler 414 may receive the input key from the LLC 106*a*-106*h* and provide the input key to the hash and logic unit 402. The hash and logic unit 402 may then compute, based on the input key and one or more hash functions, a hash value (also referred to as the "signature"), a primary bucket index (or address) of the hash table 114*a*, a secondary bucket index (or address) of the hash table 114*a*, and any alternate bucket indices. The hash and logic unit 402 may then return the computed values to the scoreboard manager 406 for locking by creating an entry in the preemptive lock board 410.

At block 514, the scoreboard manager 406 searches the preemptive lock board 410 to determine whether the input key (and/or one or more of the associated signature value, the primary bucket index, and/or the secondary bucket index computed by the hash and logic unit 402) is present in the preemptive lock board 410. If a match is found in the preemptive lock board 410, another request is being processed that targets the input key (and/or one or more of the associated signature value, the primary bucket index, and/or the secondary bucket index). More specifically, rearrangement in the hash table 114*a* may be occurring due to the processing of another query. Therefore, the logic flow 500 proceeds to block 516, where the scoreboard manager 406 waits for the lock to be released when the processing of the another request is completed. The logic flow 500 may then proceed to block 518.

Returning to decision block 514, if a match is not found in the preemptive lock board 410, a lock is not held for the input key (and/or one or more of the associated signature value, the primary bucket index, and/or the secondary bucket index), and the logic flow 500 proceeds to block 518. At block 518, the adaptive prefetch counter 412 is determined for the input key (and/or one or more of the associated signature value, the primary bucket index, and/or the secondary bucket index) and compares the adaptive prefetch counter 412 to the threshold. If the adaptive prefetch counter 412 exceeds the threshold, the scoreboard manager 406 may generate and send, to the LLC handler 414, a memory request for the primary bucket index and the secondary bucket index from the LLC 106*a*-106*h*. If the adaptive prefetch counter 412 does not exceed the threshold, the scoreboard manager 406 may generate and send, to the LLC handler 414, a memory request for the primary bucket index from the LLC 106*a*-106*h*. The scoreboard manager 406 may also update the adaptive prefetch counter 412 based on the memory request.

At block 520, the scoreboard manager 406 receives a memory response from the LLC handler 414 that includes the data requested at block 518. Furthermore, the LLC handler 414 may provide the response to the bucket buffer 416, which stores an entry corresponding to the response in the bucket buffer 416. At block 522, a signature (e.g., hash value) received in the memory response is compared to the entries of the query tracker 408 to determine if an entry including the signature exists in the query tracker 408. If a match is not detected at block 522, the logic flow 500 proceeds to block 524. At block 524, data from the secondary bucket index is fetched from the LLC 106*a*-106*h*. The signature from the secondary bucket index may be compared to the entries of the query tracker 408 to determine if an entry including the signature exists in the query tracker 408. If a match is found, the logic flow 500 proceeds to block 530. If a match is not found, the logic flow 500 proceeds to block 526, where the scoreboard manager 406 determines whether an empty slot in the primary bucket index exists. If an empty slot exists, the logic flow proceeds to block 530. If an empty slot does not exist, the logic flow 500 proceeds to block 528. At block 528, the scoreboard manager 406 selects an entry from the primary bucket index and/or any corresponding entry undergoing realignment due to the cuckoo hashing operations. The logic flow 500 may then proceed to block 530.

Returning to decision block 522, if a match is found, the logic flow 500 proceeds to block 530. At block 530, the scoreboard manager 406 adds a new entry to the preemptive lock board 410 for the query. The entry may be based on the primary bucket index, secondary bucket index, any alternate bucket indices, and the matched bucket entry (from one of blocks 522, 524, 526, or 528). At block 532, the scoreboard manager 406 may generate and send, to the LLC handler 414, a data write request based on the signature and the input key/value pair. At block 534, the scoreboard manager 406 receives a write acknowledgement from the LLC handler 414, which indicates that the key/value pair was inserted into the hash table 114*a* (e.g., at one of the primary bucket index, the secondary bucket index, or another bucket index according to the cuckoo hashing algorithm). In response, the scoreboard manager 406 clears the entries from the preemptive lock board 410 and query tracker 408 associated with the query.

Figure 6:
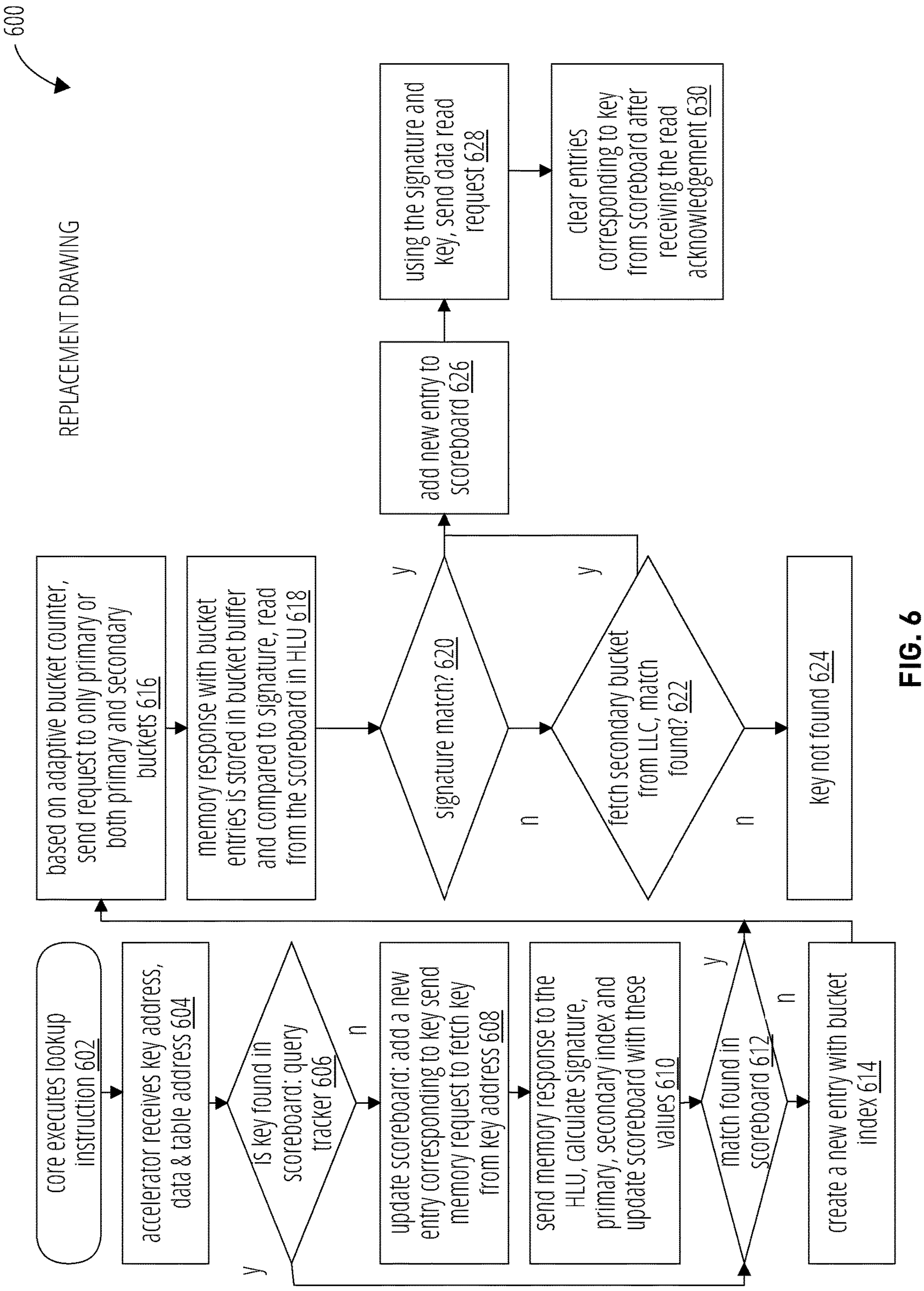
FIG. 6 illustrates an aspect of the subject matter in accordance with one embodiment.

FIG. 6 illustrates a logic flow, or routine, 600. Logic flow 600 may be representative of some or all of the operations to process a lookup instruction using the LLC hash accelerator 306. Embodiments are not limited in this context.

As shown, at block 602, a processor (e.g., one of cores 104*a*-104*h*) may execute a lookup instruction specifying to determine whether an input key (and/or associated key value) exists in a hash table such as hash table 114*a*. Because the instruction may be an ISA-defined instruction that is associated with the LLC hash accelerator 306, the processor may offload the lookup instruction to the LLC hash accelerator 306 for processing. At block 604, the LLC hash accelerator 306 may receive the lookup instruction, which may specify a key address of the input key, a memory address of the value associated with the input key, a base address of the hash table 114*a*, and a result destination.

At block 606, the scoreboard manager 406 determines whether an entry associated with the input key is in the query tracker 408 of scoreboard 404. If the entry associated with the input key is found in the query tracker 408, another query targeting the input key is being processed, and the logic flow 600 proceeds to block 612. If an entry associated with the input key is not found in the query tracker 408, the logic flow proceeds to block 608. At block 608, the scoreboard manager 406 may add an entry for the query to the query tracker 408 (e.g., an entry including the memory address of the input key, the memory address of the associated value of the key-value pair, the base address of the hash table 114*a*). The scoreboard manager 406 may then send a request to the LLC handler 414 to return the data input key from the memory address of the key specified by the query. At block 610, the LLC handler 414 may receive the input key from the LLC 106*a*-106*h* and provide the input key to the hash and logic unit 402. The hash and logic unit 402 may then compute, based on the input key and one or more hash functions, a hash value (also referred to as the "signature"), a primary bucket index (or address) of the hash table 114*a*, a secondary bucket index (or address) of the hash table 114*a*, and any alternate bucket indices of the hash table 114*a*. The scoreboard manager 406 may then create an entry to the query tracker 408 based on the values computed by the hash and logic unit 402.

At block 612, the scoreboard manager 406 searches the preemptive lock board 410 to determine whether the input key (and/or one or more of the associated signature value, the primary bucket index, and/or the secondary bucket index computed by the hash and logic unit 402) is present in the preemptive lock board 410. If a match is found in the preemptive lock board 410, another request is being processed that targets the input key (and/or one or more of the associated signature value, the primary bucket index, and/or the secondary bucket index). Therefore, the logic flow 600 may proceed to block 616. If a match is not found in the preemptive lock board 410, the logic flow 600 proceeds to block 614, the scoreboard manager 406 adds an entry for the query to the scoreboard 404 (e.g., the query tracker 408), and the logic flow 600 proceeds to block 616.

At block 616, the scoreboard manager 406 determines the adaptive prefetch counter 412 for the input key (and/or one or more of the associated signature value, the primary bucket index, and/or the secondary bucket index) and compares the adaptive prefetch counter 412 to the threshold. If the adaptive prefetch counter 412 exceeds the threshold, the scoreboard manager 406 may generate and send, to the LLC handler 414, a memory request for the primary bucket index and the secondary bucket index from the LLC 106*a*-106*h*. If the adaptive prefetch counter 412 does not exceed the threshold, the scoreboard manager 406 may generate and send, to the LLC handler 414, a memory request for the primary bucket index from the LLC 106*a*-106*h*. The scoreboard manager 406 may also update the adaptive prefetch counter 412 based on the memory request.

At block 618, the scoreboard manager 406 receives a memory response from the LLC handler 414 that includes the data requested at block 616. Furthermore, the LLC handler 414 may provide the response to the bucket buffer 416, which stores an entry corresponding to the response in the bucket buffer 416. At block 620, a signature (e.g., hash value) received in the memory response is compared to the entries of the query tracker 408 to determine if an entry including the signature exists in the query tracker 408. If a match is detected, the logic flow 600 proceeds to block 626. If a match is not detected at block 620, the logic flow proceeds to block 622.

At block 622, the data from the secondary bucket index is fetched from the LLC 106*a*-106*h*. The signature from the secondary bucket index may be compared to the entries of the query tracker 408 to determine if an entry including the signature exists in the query tracker 408. If a match is found, the logic flow 600 proceeds to block 626. If a match is not found, the logic flow 600 proceeds to block 624, where the scoreboard manager 406 determines that the input key (and/or associated key value) is not present in the hash table 114*a* (e.g., a hash table 114*a* miss). The scoreboard manager 406 may then return an indication of the miss as a response to the query.

If a match is found at block 622, the logic flow 600 proceeds to block 626. At block 626, an entry for the query is added to the preemptive lock board 410. The entry may be based on the primary bucket index, secondary bucket index, any alternate bucket indices, and the matched bucket entry (from one of blocks 620 or 622). At block 628, the scoreboard manager 406 may generate and send, to the LLC handler 414, a data read request based on the signature and the input key/value pair. At block 630, the scoreboard manager 406 receives a read acknowledgement from the LLC handler 414, which indicates whether the key/value pair was found (e.g., a hit) or not found (e.g., a miss) in the hash table 114*a* (e.g., at one of the primary bucket index, the secondary bucket index, or another bucket index). In response, the scoreboard manager 406 clears the entries from the preemptive lock board 410 and query tracker 408 associated with the query. The scoreboard manager 406 may then return an indication of the hit or the miss as a response to the query.

Figure 7:
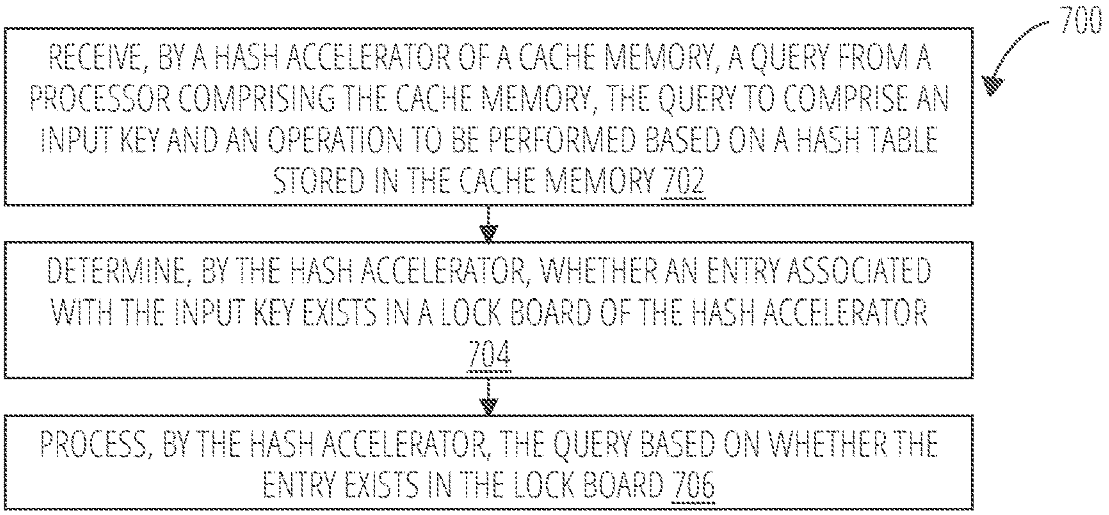
FIG. 7 illustrates a logic flow in accordance with one embodiment.

FIG. 7 illustrates an example logic flow 700, or routine, 700. Logic flow 700 may be representative of some or all of the operations to process a query using the LLC hash accelerator 306. Embodiments are not limited in this context.

In block 702, logic flow 700 receives, by the LLC hash accelerator 306 of a cache memory (e.g., LLC 106*a*-106*h*), a query from a processor comprising the cache memory, the query to comprise an input key and an operation to be performed based on a hash table (e.g., hash table 114*a* or hash table 114*b*) stored in the cache memory. The query may be to insert the input key (and/or an associated value) in the hash table 114*a*. The query may be to lookup the input key (and/or an associated value) in the hash table 114*a* to determine whether the input key and/or associated value exists in the hash table 114*a*. In block 704, logic flow 700 determines, by the LLC hash accelerator 306, whether an entry associated with the input key exists in a preemptive lock board 410 of the hash accelerator. In block 706, logic flow 700 processes, by the LLC hash accelerator 306, the query based on whether the entry exists in the preemptive lock board 410.

Figure 8:
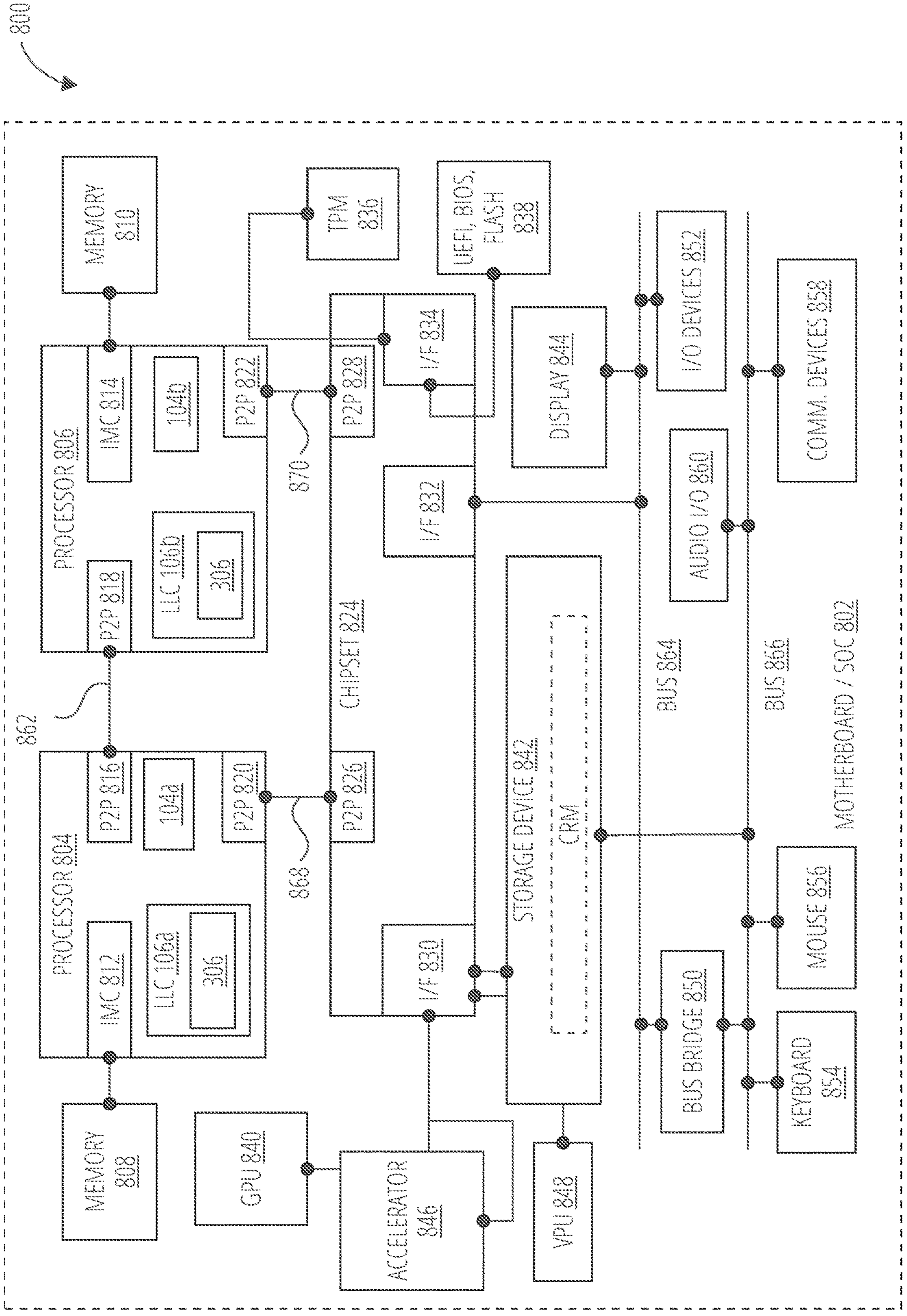
FIG. 8 illustrates an aspect of the subject matter in accordance with one embodiment.

FIG. 8 illustrates an embodiment of a system 800. System 800 is a computer system with multiple processor cores such as a distributed computing system, supercomputer, Infrastructure Processing Unit (IPU), a data processing unit (DPU), high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800 is representative of the components of a system including an LLC hash accelerator 306. More generally, the computing system 800 is configured to implement all logic, systems, logic flows, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 8, system 800 comprises a motherboard or system-on-chip (SoC) 802 for mounting platform components. Motherboard or system-on-chip (SoC) 802 is a point-to-point (P2P) interconnect platform that includes a first processor 804 and a second processor 806 coupled via a point-to-point interconnect 862 such as an Ultra Path Interconnect (UPI). In other embodiments, the system 800 may be of another bus architecture, such as a multi-drop bus. Furthermore, each of processor 804 and processor 806 may be processor packages with multiple processor cores including at least core 104*a* and core 104*b*, respectively. However, each processor 804, 806, may include respective instances of cores 104*a*-104*h*. Furthermore, each of processor 804 and processor 806 may include more caches (e.g., at least LLC 106*a*, LLC 106*b*, respectively), one or more caching agents 108 (not pictured for clarity), one or home agents 110 (not pictured for clarity), and one or more LLC hash accelerators 306 coupled via a switch fabric 112 (not pictured for clarity). While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 804 and chipset 824. Some platforms may include additional components and some platforms may only include sockets to mount the processors and/or the chipset. Furthermore, some platforms may not have sockets (e.g. SoC, or the like). Although depicted as a motherboard or SoC 802, one or more of the components of the motherboard or SoC 802 may also be included in a single die package, a multi-chip module (MCM), a multi-die package, a chiplet, a bridge, and/or an interposer. Therefore, embodiments are not limited to a motherboard or a SoC.

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 804 and/or processor 806. Additionally, the processor 804 need not be identical to processor 806.

Processor 804 includes an integrated memory controller (IMC) 812 and point-to-point (P2P) interface 816 and P2P interface 820. Similarly, the processor 806 includes an IMC 814 as well as P2P interface 818 and P2P interface 822. IMC 812 and IMC 814 couple the processor 804 and processor 806, respectively, to respective memories (e.g., memory 808 and memory 810). Memory 808 and memory 810 may be portions of the main memory (e.g., a dynamic random-access memory (DRAM)) for the platform such as double data rate type 4 (DDR4) or type 5 (DDR5) synchronous DRAM (SDRAM). Memory 808 and memory 810 are representative of memory 102*a* and memory 102*b*. In the present embodiment, the memory 808 and the memory 810 locally attach to the respective processors (e.g., processor 804 and processor 806). In other embodiments, the main memory may couple with the processors via a bus and shared memory hub. In some embodiments, the IMC 812 and/or the IMC 814 may include the LLCs 106*a*-106*h*, caching agents 108*a*-108*h*, and circuitry 314, e.g., the LLC hash accelerator 306 and the components thereof. The IMC 812 and/or the IMC 814 may be used for far memory and/or for memory pooling.

System 800 includes chipset 824 coupled to processor 804 and processor 806. Furthermore, chipset 824 can be coupled to storage device 842, for example, via an interface (I/F) 830. The I/F 830 may be, for example, a Peripheral Component Interconnect-enhanced (PCIe) interface, a Compute Express Link® (CXL) interface, or a Universal Chiplet Interconnect Express (UCIe) interface. Storage device 842 can store instructions executable by circuitry of system 800 (e.g., processor 804, processor 806, GPU 840, accelerator 846, vision processing unit 848, or the like). For example, storage device 842 can store instructions for the LLC hash accelerator 306, logic flow 500, logic flow 600, logic flow 700, or the like.

Processor 804 couples to the chipset 824 via P2P interface 820 and P2P 826 while processor 806 couples to the chipset 824 via P2P interface 822 and P2P 828. Direct media interface (DMI) 868 and DMI 870 may couple the P2P interface 820 and the P2P 826 and the P2P interface 822 and P2P 828, respectively. DMI 868 and DMI 870 may be a high-speed interconnect that facilitates, e.g., eight Giga Transfers per second (GT/s) such as DMI 3.0. In other embodiments, the processor 804 and processor 806 may interconnect via a bus.

The chipset 824 may comprise a controller hub such as a platform controller hub (PCH). The chipset 824 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 824 may comprise more than one controller hub such as a chipset with a memory controller hub, a graphics controller hub, and an input/output (I/O) controller hub.

In the depicted example, chipset 824 couples with a trusted platform module (TPM) 836 and UEFI, BIOS, FLASH circuitry 838 via I/F 834. The TPM 836 is a dedicated microcontroller designed to secure hardware by integrating cryptographic keys into devices. The UEFI, BIOS, FLASH circuitry 838 may provide pre-boot code.

Furthermore, chipset 824 includes the I/F 830 to couple chipset 824 with a high-performance graphics engine, such as, graphics processing circuitry or a graphics processing unit (GPU) 840. In other embodiments, the system 800 may include a flexible display interface (FDI) (not shown) between the processor 804 and/or the processor 806 and the chipset 824. The FDI interconnects a graphics processor core in one or more of processor 804 and/or processor 806 with the chipset 824.

Additionally, accelerator 846 and/or vision processing unit 848 can be coupled to chipset 824 via I/F 830. Accelerator 846 is representative of any type of accelerator device, such as a data streaming accelerator, cryptographic accelerator, cryptographic co-processor, an offload engine, and the like. One example of an accelerator 846 is the Intel® Data Streaming Accelerator (DSA). The accelerator 846 may be a device including circuitry to accelerate data copying, data encryption, and/or data compression. The accelerator 846 can also include circuitry arranged to execute machine learning (ML) related operations (e.g., training, inference, etc.) for ML models. Generally, the accelerator 846 may be specially designed to perform computationally intensive operations, such as cryptographic operations, data copying operations, and/or compression operations, in a manner that is far more efficient than when performed by the processor 804 or processor 806. Because the load of the system 800 may include cryptographic and/or compression operations, the accelerator 846 can greatly increase performance of the system 800 for these operations.

Accelerator 846 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 846 For example, the accelerator 846 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 846 via a non-posted write (e.g., a deferred memory write (DMWr)). One example of an instruction that atomically submits a work descriptor to the shared work queue of the accelerator 846 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 846. A dedicated work queue may accept job submissions from software via commands such as the movdir64b instruction.

Various I/O devices 852 and display 844 couple to the bus 864, along with a bus bridge 850 which couples the bus 864 to a second bus 866 and an I/F 832 that connects the bus 864 with the chipset 824. In one embodiment, the second bus 866 may be a low pin count (LPC) bus. Various devices may couple to the second bus 866 including, for example, a keyboard 854, a mouse 856 and communication devices 858.

Furthermore, an audio I/O 860 may couple to second bus 866. Many of the I/O devices 852 and communication devices 858 may reside on the motherboard or system-on-chip (SoC) 802 while the keyboard 854 and the mouse 856 may be add-on peripherals. In other embodiments, some or all the I/O devices 852 and communication devices 858 are add-on peripherals and do not reside on the motherboard or system-on-chip (SoC) 802.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

Example 1 includes apparatus, comprising: a processor to comprise a cache memory; and the cache memory to comprise circuitry for a hash accelerator, the circuitry for the hash accelerator to: receive a query from the processor, the query to comprise an input key and an operation to be performed based on a hash table to be stored in the cache memory; determine whether an entry associated with the input key exists in a lock board of the hash accelerator; and process the query based on whether the entry exists in the lock board.

Example 2 includes the subject matter of example 1, the circuitry for the hash accelerator to: determine the entry associated with the input key exists in the lock board, wherein the entry is associated with another query; and refrain from processing the query until processing of the another query completes, the completion of the processing of the another query to release a lock on associated with the hash table to permit the query to be processed.

Example 3 includes the subject matter of example 1, the circuitry for the hash accelerator to, prior to the determination of whether the entry associated with the input key exists in the lock board: add an entry associated with the input key to a query tracker of the hash accelerator; determine the entry associated with the input key does not exist in the lock board; and add the entry associated with the input key to the lock board.

Example 4 includes the subject matter of example 3, the circuitry for the hash accelerator to: receive, from the cache memory, a cache response based on the query; compute a signature value, a primary index, and a secondary index based on one or more hash functions; and process the query based on the hash table, the signature value, and the input key.

Example 5 includes the subject matter of example 4, the circuitry for the hash accelerator to, prior to receiving the cache response: determine an adaptive prefetch counter and a threshold; and fetch, from the cache memory based on the adaptive prefetch counter and the threshold, one of: (i) data stored at the primary index, or (ii) the data stored at the primary index and data stored at the secondary index.

Example 6 includes the subject matter of example 3, the circuitry for the hash accelerator to: receive another query from the processor, the another query to comprise the input key and another operation to be performed based on the hash table; identify the entry associated with the input key in the query tracker; and refrain from processing the another query until processing of the query completes.

Example 7 includes the subject matter of example 1, wherein the operation to be based at least in part on a cuckoo hashing algorithm, wherein the operation is to comprise a lookup operation in the hash table based on the input key or an insert operation to insert the input key in the hash table.

Example 8 includes a method, comprising: receiving, by a hash accelerator of a cache memory, a query from a processor comprising the cache memory, the query to comprise an input key and an operation to be performed based on a hash table stored in the cache memory; determining, by the hash accelerator, whether an entry associated with the input key exists in a lock board of the hash accelerator; and processing, by the hash accelerator, the query based on whether the entry exists in the lock board.

Example 9 includes the subject matter of example 8, further comprising: determining, by the hash accelerator, the entry associated with the input key exists in the lock board, wherein the entry is associated with another query; and refraining, by the hash accelerator, from processing the query until processing of the another query completes, the completion of the processing of the another query to release a lock on associated with the hash table to permit the query to be processed.

Example 10 includes the subject matter of example 8, further comprising, prior to determining whether the entry associated with the input key exists in the lock board: adding, by the hash accelerator, an entry associated with the input key to a query tracker of the hash accelerator; determining, by the hash accelerator, the entry associated with the input key does not exist in the lock board; and adding, by the hash accelerator, the entry associated with the input key to the lock board.

Example 11 includes the subject matter of example 10, further comprising: receiving, by the hash accelerator from the cache memory, a cache response based on the query; computing, by the hash accelerator, a signature value, a primary index, and a secondary index based on one or more hash functions; and processing, by the hash accelerator, the query based on the hash table, the signature value, and the input key.

Example 12 includes the subject matter of example 11, further comprising, prior to receiving the cache response: determining, by the hash accelerator, an adaptive prefetch counter and a threshold; and fetching, by the hash accelerator from the cache memory based on the adaptive prefetch counter and the threshold, one of: (i) data stored at the primary index, or (ii) the data stored at the primary index and data stored at the secondary index.

Example 13 includes the subject matter of example 10, further comprising: receiving, by the hash accelerator, another query from the processor, the another query to comprise the input key and another operation to be performed based on the hash table; identifying, by the hash accelerator, the entry associated with the input key in the query tracker; and refraining, by the hash accelerator, from processing the another query until processing of the query completes.

Example 14 includes the subject matter of example 8, wherein the operation to be based at least in part on a cuckoo hashing algorithm, wherein the operation is to comprise a lookup operation in the hash table based on the input key or an insert operation to insert the input key in the hash table.

Example 15 includes non-transitory computer-readable storage medium including instructions that when executed by a hash accelerator, cause the hash accelerator to: receive a query from a processor, the query to comprise an input key and an operation to be performed based on a hash table stored in a cache memory of the processor; determine whether an entry associated with the input key exists in a lock board of the hash accelerator; and process the query based on whether the entry exists in the lock board.

Example 16 includes the subject matter of example 15, wherein the instructions further cause the hash accelerator to: determine the entry associated with the input key exists in the lock board, wherein the entry is associated with another query; and refrain from processing the query until processing of the another query completes, the completion of the processing of the another query to release a lock on associated with the hash table to permit the query to be processed.

Example 17 includes the subject matter of example 15, wherein the instructions further cause the hash accelerator, prior to determining whether the entry associated with the input key exists in the lock board: add an entry associated with the input key to a query tracker of the hash accelerator; determine the entry associated with the input key does not exist in the lock board; and add the entry associated with the input key to the lock board.

Example 18 includes the subject matter of example 17, wherein the instructions further cause the hash accelerator to: receive, from the cache memory, a cache response based on the query; compute a signature value, a primary index, and a secondary index based on one or more hash functions; and process the query based on the hash table, the signature value, and the input key.

Example 19 includes the subject matter of example 18, wherein the instructions further cause the hash accelerator to, prior to receiving the cache response: determine an adaptive prefetch counter and a threshold; and fetch, from the cache memory based on the adaptive prefetch counter and the threshold, one of: (i) data stored at the primary index, or (ii) the data stored at the primary index and data stored at the secondary index.

Example 20 includes the subject matter of example 18, wherein the instructions further cause the hash accelerator to: receive another query from the processor, the another query to comprise the input key and another operation to be performed based on the hash table; identify the entry associated with the input key in the query tracker; and refrain from processing the another query until processing of the query completes.

Example 21 includes the subject matter of example 15, wherein the operation to be based at least in part on a cuckoo hash algorithm, wherein the operation is to comprise a lookup operation in the hash table based on the input key or an insert operation to insert the input key in the hash table.

Example 22 includes apparatus, comprising: means for receiving, by a hash accelerator of a cache memory, a query from a processor comprising the cache memory, the query to comprise an input key and an operation to be performed based on a hash table stored in the cache memory; means for determining, by the hash accelerator, whether an entry associated with the input key exists in a lock board of the hash accelerator; and means for processing, by the hash accelerator, the query based on whether the entry exists in the lock board.

Example 23 includes the subject matter of example 22, further comprising: means for determining, by the hash accelerator, the entry associated with the input key exists in the lock board, wherein the entry is associated with another query; and means for refraining, by the hash accelerator, from processing the query until processing of the another query completes, the completion of the processing of the another query to release a lock on associated with the hash table to permit the query to be processed.

Example 24 includes the subject matter of example 22, further comprising, prior to determining whether the entry associated with the input key exists in the lock board: means for adding, by the hash accelerator, an entry associated with the input key to a query tracker of the hash accelerator; means for determining, by the hash accelerator, the entry associated with the input key does not exist in the lock board; and means for adding, by the hash accelerator, the entry associated with the input key to the lock board.

Example 25 includes the subject matter of example 24, further comprising: means for receiving, by the hash accelerator from the cache memory, a cache response based on the query; means for computing, by the hash accelerator, a signature value, a primary index, and a secondary index based on one or more hash functions; and means for processing, by the hash accelerator, the query based on the hash table, the signature value, and the input key.

Example 26 includes the subject matter of example 25, further comprising, prior to receiving the cache response: means for determining, by the hash accelerator, an adaptive prefetch counter and a threshold; and means for fetching, by the hash accelerator from the cache memory based on the adaptive prefetch counter and the threshold, one of: (i) data stored at the primary index, or (ii) the data stored at the primary index and data stored at the secondary index.

Example 27 includes the subject matter of example 24, further comprising: means for receiving, by the hash accelerator, another query from the processor, the another query to comprise the input key and another operation to be performed based on the hash table; means for identifying, by the hash accelerator, the entry associated with the input key in the query tracker; and means for refraining, by the hash accelerator, from processing the another query until processing of the query completes.

Example 28 includes the subject matter of example 22, wherein the operation to be based at least in part on a cuckoo hashing algorithm, wherein the operation is to comprise a lookup operation in the hash table based on the input key or an insert operation to insert the input key in the hash table.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:

a processor to comprise a cache memory; and the cache memory to comprise circuitry for a hash accelerator, the circuitry for the hash accelerator to:

receive a query from the processor, the query to comprise an input key and an operation to be performed based on a hash table to be stored in the cache memory;

add an entry associated with the input key to a query tracker of the hash accelerator;

determine whether the entry associated with the input key exists in a lock board of the hash accelerator; and process the query based on whether the entry exists in the lock board.

2. The apparatus of claim 1, the circuitry for the hash accelerator to:

determine the entry associated with the input key exists in the lock board, wherein the entry is associated with another query; and refrain from processing the query until processing of the another query completes, the completion of the processing of the another query to release a lock associated with the hash table to permit the query to be processed.

3. The apparatus of claim 1, the circuitry for the hash accelerator to:

determine the entry associated with the input key does not exist in the lock board; and add the entry associated with the input key to the lock board.

4. The apparatus of claim 3, the circuitry for the hash accelerator to:

receive, from the cache memory, a cache response based on the query;

compute a signature value, a primary index, and a secondary index based on one or more hash functions; and
process the query based on the hash table, the signature value, and the input key.

5. The apparatus of claim 4, the circuitry for the hash accelerator to, prior to receiving the cache response:
determine an adaptive prefetch counter and a threshold; and
fetch, from the cache memory based on the adaptive prefetch counter and the threshold, one of: (i) data stored at the primary index, or (ii) the data stored at the primary index and data stored at the secondary index.

6. The apparatus of claim 3, the circuitry for the hash accelerator to:
receive another query from the processor, the another query to comprise the input key and another operation to be performed based on the hash table;
identify the entry associated with the input key in the query tracker; and
refrain from processing the another query until processing of the query completes.

7. The apparatus of claim 1, wherein the operation to be based at least in part on a cuckoo hashing algorithm, wherein the operation is to comprise a lookup operation in the hash table based on the input key or an insert operation to insert the input key in the hash table.

8. A method, comprising:
receiving, by a hash accelerator of a cache memory, a query from a processor comprising the cache memory, the query to comprise an input key and an operation to be performed based on a hash table stored in the cache memory;
adding, by the hash accelerator, an entry associated with the input key to a query tracker of the hash accelerator;
determining, by the hash accelerator, whether the entry associated with the input key exists in a lock board of the hash accelerator; and
processing, by the hash accelerator, the query based on whether the entry exists in the lock board.

9. The method of claim 8, further comprising:
determining, by the hash accelerator, the entry associated with the input key exists in the lock board, wherein the entry is associated with another query; and
refraining, by the hash accelerator, from processing the query until processing of the another query completes, the completion of the processing of the another query to release a lock associated with the hash table to permit the query to be processed.

10. The method of claim 8, further comprising,
determining, by the hash accelerator, the entry associated with the input key does not exist in the lock board; and
adding, by the hash accelerator, the entry associated with the input key to the lock board.

11. The method of claim 10, further comprising:
receiving, by the hash accelerator from the cache memory, a cache response based on the query;
computing, by the hash accelerator, a signature value, a primary index, and a secondary index based on one or more hash functions; and
processing, by the hash accelerator, the query based on the hash table, the signature value, and the input key.

12. The method of claim 11, further comprising, prior to receiving the cache response:
determining, by the hash accelerator, an adaptive prefetch counter and a threshold; and
fetching, by the hash accelerator from the cache memory based on the adaptive prefetch counter and the threshold, one of: (i) data stored at the primary index, or (ii) the data stored at the primary index and data stored at the secondary index.

13. The method of claim 10, further comprising:
receiving, by the hash accelerator, another query from the processor, the another query to comprise the input key and another operation to be performed based on the hash table;
identifying, by the hash accelerator, the entry associated with the input key in the query tracker; and
refraining, by the hash accelerator, from processing the another query until processing of the query completes.

14. The method of claim 8, wherein the operation to be based at least in part on a cuckoo hashing algorithm, wherein the operation is to comprise a lookup operation in the hash table based on the input key or an insert operation to insert the input key in the hash table.

15. A non-transitory computer-readable storage medium including instructions that when executed by a hash accelerator, cause the hash accelerator to:
receive a query from a processor, the query to comprise an input key and an operation to be performed based on a hash table stored in a cache memory of the processor;
add an entry associated with the input key to a query tracker of the hash accelerator;
determine whether the entry associated with the input key exists in a lock board of the hash accelerator; and
process the query based on whether the entry exists in the lock board.

16. The computer-readable storage medium of claim 15, wherein the instructions further cause the hash accelerator to:
determine the entry associated with the input key exists in the lock board, wherein the entry is associated with another query; and
refrain from processing the query until processing of the another query completes, the completion of the processing of the another query to release a lock associated with the hash table to permit the query to be processed.

17. The computer-readable storage medium of claim 15, wherein the instructions further cause the hash accelerator to:
determine the entry associated with the input key does not exist in the lock board; and
add the entry associated with the input key to the lock board.

18. The computer-readable storage medium of claim 17, wherein the instructions further cause the hash accelerator to:
receive, from the cache memory, a cache response based on the query;
compute a signature value, a primary index, and a secondary index based on one or more hash functions; and
process the query based on the hash table, the signature value, and the input key.

19. The computer-readable storage medium of claim 18, wherein the instructions further cause the hash accelerator to, prior to receiving the cache response:
determine an adaptive prefetch counter and a threshold; and
fetch, from the cache memory based on the adaptive prefetch counter and the threshold, one of: (i) data stored at the primary index, or (ii) the data stored at the primary index and data stored at the secondary index.

20. The computer-readable storage medium of claim 15, wherein the operation to be based at least in part on a cuckoo hash algorithm, wherein the operation is to comprise a lookup operation in the hash table based on the input key or an insert operation to insert the input key in the hash table.

* * * * *